United States Patent
Tietsch et al.

(10) Patent No.: US 9,769,042 B2
(45) Date of Patent: *Sep. 19, 2017

(54) METHOD FOR MONITORING A COMMUNICATION SYSTEM

(71) Applicant: Unify GmbH & Co. KG, Munich (DE)

(72) Inventors: Michael Tietsch, Kaufering (DE); Karl Klaghofer, Munich (DE); Holger Prange, Munich (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,470

(22) Filed: Apr. 25, 2016

(65) Prior Publication Data

US 2016/0241453 A1 Aug. 18, 2016

Related U.S. Application Data

(63) Continuation of application No. 14/700,307, filed on Apr. 30, 2015, now Pat. No. 9,356,850, which is a
(Continued)

(51) Int. Cl.
*H04L 12/26* (2006.01)
*H04L 12/24* (2006.01)

(52) U.S. Cl.
CPC ........ *H04L 43/0823* (2013.01); *H04L 41/069* (2013.01); *H04L 43/04* (2013.01);
(Continued)

(58) Field of Classification Search
CPC ... H04L 43/0823; H04L 41/069; H04L 43/04; H04L 43/06; H04L 43/08
See application file for complete search history.

(56) References Cited

U.S. PATENT DOCUMENTS

| | | | | |
|---|---|---|---|---|
| 2003/0022629 | A1* | 1/2003 | Miyoshi | .............. H04L 1/0003 455/67.13 |
| 2004/0088404 | A1* | 5/2004 | Aggarwal | ........... H04L 12/2602 709/224 |

(Continued)

FOREIGN PATENT DOCUMENTS

| | | |
|---|---|---|
| CN | 1529959 A | 9/2004 |
| CN | 1571368 A | 1/2005 |

(Continued)

OTHER PUBLICATIONS

International Preliminary Report on Patentability and Written Opinion for PCT/EP2010/007540 dated Jun. 20, 2013 (German Translation).

(Continued)

*Primary Examiner* — Ronald B Abelson
(74) *Attorney, Agent, or Firm* — Buchanan Ingersoll & Rooney PC

(57) ABSTRACT

The invention relates to a method for monitoring a communication system, comprising: acquiring and storing data about timeout events or faulty transfers in connection with at least one signaling process in at least one first communication terminal (1, 2, 3) of the communication system; and creating a collection of such data and transferring (7, 8, 10) said collection to a collection point (4) for said data in the communication system.

20 Claims, 1 Drawing Sheet

Related U.S. Application Data continuation of application No. 13/991,511, filed as application No. PCT/EP2010/007540 on Dec. 10, 2010, now Pat. No. 9,054,960.

(52) U.S. Cl.
CPC ............. *H04L 43/06* (2013.01); *H04L 43/08* (2013.01); *H04L 41/0213* (2013.01); *H04L 41/046* (2013.01)

(56) References Cited

U.S. PATENT DOCUMENTS

| | | | |
|---|---|---|---|
| 2005/0107095 A1* | 5/2005 | Samuel | H04W 24/00 455/456.5 |
| 2006/0224727 A1* | 10/2006 | Kumakura | H04L 12/66 709/224 |
| 2008/0268840 A1 | 10/2008 | McDonald | |
| 2009/0237240 A1 | 9/2009 | Leung et al. | |
| 2010/0284267 A1* | 11/2010 | Domingguez Romero | H04W 76/027 370/216 |

FOREIGN PATENT DOCUMENTS

| | | | |
|---|---|---|---|
| CN | 1878384 A | 12/2006 | |
| CN | 101018160 A | 8/2007 | |
| CN | 101052020 A | 10/2007 | |
| SE | WO2010151187 | * 12/2010 | ............... H04L 5/00 |
| WO | 00/64083 A1 | 10/2000 | |

OTHER PUBLICATIONS

International Preliminary Report on Patentability and Written Opinion for PCT/EP2010/007540 dated Jun. 20, 2013 (English Translation).

Written Opinion of the International Searching Authority for PCT/EP2010/007540 dated Apr. 8, 2011 (German Translation).

International Search Report for PCT/EP2010/007540 dated Apr. 8, 2011 (German Translation).

External Media Gateway Control Protocol XGCP-MIB; Dihn Nguyen et al., Cisco Systems, Apr. 13, 1999.

IETF Standard-working-Draft, Internet Engineering Task Force, R.A. Woodburn, Oct. 1, 1993.

Definitions and Managed Objects for Operations, Administration, and Maintenance (OAM) Functions on Ethernet-Like Interfaces, IETF Standard, Internet Engineering Task Force, M. Squire, Jun. 1, 2007.

Simple Network Management Protocol (SNMP) over Transmission Control Protocol (TCP), IETF Standard, Internet Engineering Task Force, IETF, J. Schoenwaelder, Dec. 1, 2002.

* cited by examiner

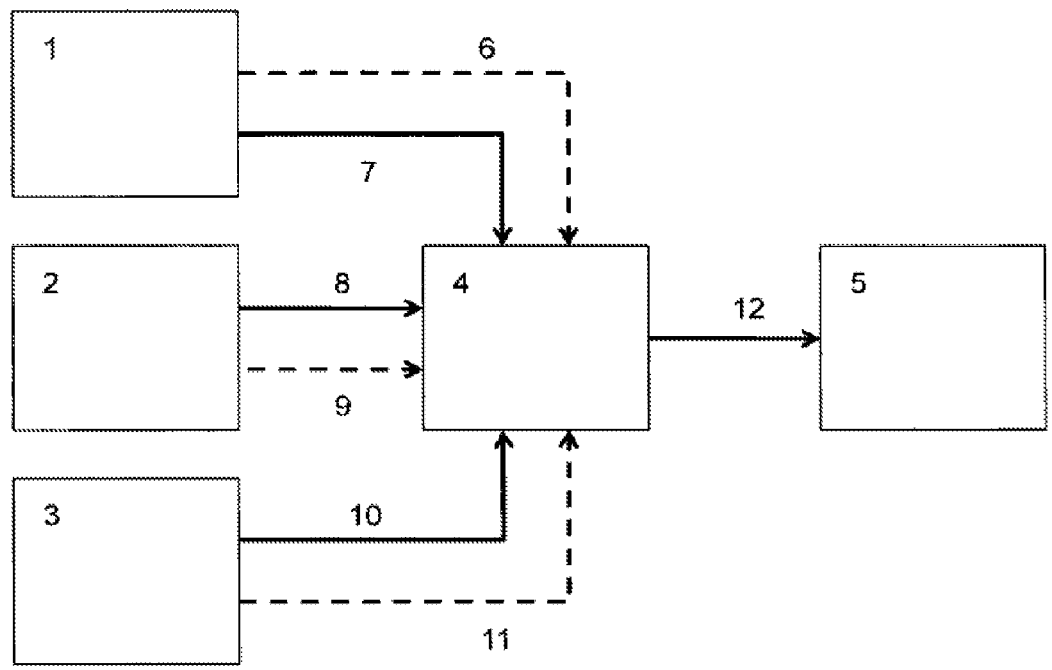

METHOD FOR MONITORING A COMMUNICATION SYSTEM

CROSS REFERENCE TO RELATED APPLICATIONS

This application is a continuation application of U.S. patent application Ser. No. 14/700,307, which is a continuation of U.S. patent application Ser. No. 13/991,511, which is the United States national phase under 35 U.S.C. §371 of PCT International Application No. PCT/EP2010/007540, filed on Dec. 10, 2010.

BACKGROUND OF THE INVENTION

Field of the Invention

Embodiments relate to methods for monitoring a communication system, such as a Voice-over-IP (VoIP) or Voice and Video-over-IP (VVoIP) system or another type of communication system.

Background of the Related Art

The term TRAP, within the framework of the Simple Network Management Protocol (SNMP), designates an unsolicited message from one agent to the manager, in which the agent informs the manager that an event has occurred. For monitoring network elements through a central station within the framework of the Simple Network Management Protocol (SNMP), so-called agents are used. These are programs that preferably run directly on the monitored devices. These programs are able to determine the status of the device and even adjust settings or take actions by themselves. The Simple Network Management Protocol (SNMP) is a network protocol that was developed by the IETF to allow network elements (e.g., routers, servers, switches, printers, computers, etc.) to be monitored and controlled from a central station. As part of this, the protocol controls communication between the monitored devices and the monitoring station.

The Simple Network Management Protocol (SNMP) describes the creation of data packets that can be sent, and the communication process. It was designed so that any network-capable device can be included in the monitoring. The types of network management that are possible with the SNMP include monitoring network components, remote control and remote configuration of network components, or error recognition and error reporting.

Because of its simplicity, modularity, and versatility, the Simple Network Management Protocol (SNMP) has become the standard that is supported by most management programs and also terminals. Therefore, the Simple Network Management Protocol (SNMP), for example, does not rely on the IP network protocol for transportation. There are implementations that can be addressed through IPX (Novell, NetWare) or Apple Talk (Apple, Mac OS).

BRIEF SUMMARY OF THE INVENTION

Embodiments provide for a method for monitoring a communication system, in which data about timeout events or faulty transfers in connection with at least one signaling process in at least one first communication terminal of the communication system are acquired and stored. The acquired and stored data are compiled into a collection, and this collection is transferred to a collection point for these data in the communication system.

In this regard, a timeout event is understood to be an event in the communication system wherein a communication terminal, preferably using time measurement equipment, registers the absence of a reaction from another device or devices in the communication system that is expected by that communication terminal. Such reactions are, for example, acknowledgements from components of the communication system, which they send to the communication system after receiving signals from the communication terminal.

If acknowledgement does not come, for example, the communication terminal can react by repeating the message. If the resulting message repetition is successful, proper functioning of the communication system is thereby ensured, but a user of the system sometimes has to wait longer than expected for the dial tone when making a call, without knowing why.

Other examples of data about timeout events in this regard are answering times beyond a defined threshold value, message repetitions, interruption of processes due to the complete absence of acknowledgements, or similar events.

In addition to such timeout events, there are also faulty or inadmissible information elements that were rejected and/or replaced by defaults. These and other faulty or inadmissible information elements are examples of data about faulty transfers in connection with signaling processes of a communication terminal in the communication system.

BRIEF DESCRIPTION OF THE FIGURES

FIG. 1 shows a schematic view of one exemplary embodiment of a communication system according to the invention, together with the data streams involved.

DETAILED DESCRIPTION OF THE INVENTION

When observing response times, the relevant time frames are preferably shorter than the duration of the protocol-timer in use, which would lead to message repetitions, for example. This would give rise to the advantage that anomalies could be recognized before there were perceptible or even dramatic effects on the connection.

In a preferred embodiment of the invention, the data about timeout events or faulty transfers in connection with at least one signaling process include information or answering times for the communication system in connection with this signaling process, in which the first communication terminal is involved.

According to this or other preferred exemplary embodiments of the invention, the data preferably include information about message repetitions in connection with at least one signaling process in which the communication terminal is involved. This gives rise to the advantage that events resulting in message repetitions do not go undetected, but instead can be individually or statistically acquired and evaluated, so that measures can be taken to improve service quality.

According to this or other preferred exemplary embodiments of the invention, the data preferably include information about interruptions of signaling procedures due to the absence of acknowledgements in connection with at least one signaling process in which the first communication terminal is involved. This gives rise to the advantage that events resulting in interruptions of signaling procedures due to the absence of acknowledgements do not go undetected, but instead can be individually or statistically acquired and evaluated, so that measures can be taken to improve service quality.

According to this or other preferred exemplary embodiments of the invention, the data preferably include information about faulty or inadmissible information elements in connection with at least one signaling process in which the first communication terminal is involved. This gives rise to the advantage that events generating or resulting in faulty or inadmissible information elements in connection with at least one signaling process do not go undetected, but instead can be individually or statistically acquired and evaluated, so that measures can be taken to improve service quality.

The data preferably include information about the data collection time. The data also preferably include information about the address of a second communication terminal, with which the first communication terminal is communicating or wishes to communicate. The data also preferably include information about the CPU usage of a component in the communication system involved in the signaling process when the data are collected.

In this way, for the aforementioned events or other events to be acquired, information can be assigned regarding the time, the address of a second communication terminal with which the first communication terminal is communicating or wishes to communicate, or the CPU usage of a component of the communication system involved in the signaling process, so that corresponding classification and/or systemization of this event is possible and measures can be taken to improve service quality.

According to a preferred exemplary embodiment of the invention, which can also be combined with other exemplary embodiments of the invention, the data collection is transmitted after a reliable connection is established from the first communication terminal to the collection point for these data in the communication system. In this way, errors or omissions in transmitting these data can be reduced or prevented.

According to an additional preferred exemplary embodiment of the invention, whose features can also be combined with the features of other exemplary embodiments of the invention, the data collection is transmitted preferably as an unsolicited message, in particular preferably as a so-called TRAP, from the first communication terminal to the collection point within the framework of a network management protocol, preferably using the Simple Network Management Protocol (SNMP).

Preferably, the data collection is transmitted as an unsolicited message from the first communication terminal to the collection point within the framework of a transfer protocol, preferably within the framework of the Transmission Control Protocol (TCP) or the User Datagram Protocol (UDP).

The User Datagram Protocol (UDP) is a minimal, connection-free network protocol that belongs to the transportation layer of the internet protocol family. The purpose of the UDP is to ensure that data sent over the Internet are received by the correct application.

The development of the UDP began in 1977, when a simpler protocol than the previous connection-oriented TCP was needed to transfer speech. A protocol was needed that was appropriate only for addressing, without transferring data, because that would cause delays in the speech transmission.

So that data sent with UDP are received by the correct program on the target computer, UDP uses ports. With UDP, the port number of the service that should receive the data is sent with the data. This expansion from a host-to-host to a process-to-process transfer is designated as application multiplexing or application demultiplexing.

In addition, UDP offers the possibility of integrity testing, in which a checksum is included in the transmission. This allows transmission errors to be detected. UDP provides a connection-free, non-guaranteed transmission service. That means that it gives no guarantee that a packet sent once will arrive, that packets will arrive in the same sequence as that in which they were sent, or that a packet will reach the receiver only once. An application using UDP is therefore preferably unaffected by lost and unsorted packets, by providing or using its own corresponding corrective measures, for example.

Because it is not necessary to establish a connection before beginning the transfer, the partners can begin the data exchange sooner. This primarily affects applications that only need to exchange small data volumes. Simple question-answer protocols like the domain name system use UDP to keep the network load low and thereby increase data throughput. A three-way handshake as with the transmission control protocol for establishing the connection would generate unnecessary overhead.

In addition, the non-guaranteed transmission also offers the advantage of smaller transmission delay fluctuations: if a packet is lost in a TCP-connection, it is automatically resent. This takes time that can make the transmission duration fluctuate, which is bad for multimedia applications. In VoIP, for example, it can cause sudden interruptions, or the return buffer has to be larger. With connection-free communication services, lost packets do not cause the entire transfer to bog down, but instead merely reduce the quality slightly.

IP may delete packets in case of transfer errors or overloads. Datagrams can therefore fail. UDP has no recognition or correction mechanism for this, as TCP can. In the case of multiple possible routes to the target, IP can choose new paths if necessary. This makes it possible, in rare cases, for data sent later to pass up data sent earlier. In addition, a data packet sent once can arrive at the receiver multiple times.

In connection with embodiments of this invention, the User Datagram Protocol (UDP) offers the advantage that no connection is established, so the related processes and resources are not needed (lower overhead).

The Transmission Control Protocol (TCP) is an agreement (protocol) governing how and what types of data are exchanged between computers. All operating systems in modern computers have TCP and use it for exchanging data with other computers. The protocol is a guaranteed, connection-oriented, packet-driven transport protocol for computer networks. It is part of the Internet protocol family, the foundation of the Internet.

TCP was developed by Robert E. Kahn and Vinton G. Cerf. Their research work, started in 1973, lasted several years. The first standardization of TCP therefore was not released until 1981 as RFC 793. There have been many expansions since then, which are specified today in new RFCs, a series of technical and organizational documents about the Internet.

Unlike the connection-free UDP (User Datagram Protocol), TCP establishes a connection between two endpoints (sockets) in a network connection. Data can be transferred in both directions over this connection.

TCP is usually attached to the IP (Internet Protocol), which is therefore frequently (and often not quite correctly) also called the "TCP/IP protocol." It lies in Layer 4 of the OSI reference model.

Because of its many advantageous characteristics (data losses are recognized and automatically corrected, data transfer is possible in both directions, network overloading is prevented, etc.), TCP is a very widely used data transfer protocol. For example, TCP is used almost exclusively as the transport medium for the WWW, e-mail, and many other popular network services.

Also preferred are exemplary embodiments of the invention in which the data collection is transmitted, preferably as an unsolicited message, from the first communication terminal to the collection point within the framework of a Voice-over-IP signal, preferably governed by the Session Initiation Protocol.

IP telephony (short for Internet Protocol telephony), also called Internet telephony or voice over IP (VoIP for short), is telephoning over computer networks that are set up according to Internet standards. As part of the process, typical telephony information, i.e., speech and control information for establishing the connection, for example, is sent over a network that can also be used for data transmission. For the participants in the conversation, computers, IP-telephony-capable telephone terminals, or even standard telephones connected through special adapters can be used to establish the connection.

IP telephony is a technology that makes it possible to provide telephone service on an IP infrastructure, so that it can replace the ISDN, network, and all components of standard telephone technology. Its goal is to reduce the costs of standard network configuration and operation. Based on the high use rate of classic telephone systems and the new investments required for IP telephony, the switch is often a long-lasting gradual transition with existing providers. In the meantime, both technologies exist in parallel (smooth migration). There is therefore a clear need for solutions for connecting both telephone systems (e.g., via VoIP gateways) as well as a need for goal-oriented planning of the system switch, with consideration given to the respective cost and performance optimization possibilities. New providers are increasingly promoting only the new technology (i.e., IP telephony instead of standard telephones) on the market.

The Session Initiation Protocol (SIP) is a network protocol used to create, control, and terminate a communication session involving two or more participants. The protocol is specified in RFC 3261, among others. SIP is a commonly used protocol for IP telephony.

Unlike H.323, which came from the ITU-T, SIP was developed from the IETF. H.323 can be described very simply as "ISDN via IP." This allowed telephone equipment manufacturers in particular to shift communication comparatively quickly and easily to IP networks, but the strengths and weaknesses of IP networks were not adequately considered.

The SIP design, on the other hand, is based on the Hypertext Transfer Protocol (but is not compatible with it) and is clearly better suited for IP networks. The SIP setup makes it possible to incorporate new additions easily, without all involved devices having to know about it. It is also generally known that: While H.323 is predominantly thought of for telephony, any type of conversation can be handled with SIP. The session's "usage load," i.e., the user data streams to be transferred, can in principle be any type of data streams that can be carried over a network. The most common are audio and video transmissions, but some online games, for example, also use SIP to handle their transmissions.

To make an Internet telephone call, one needs more than just SIP, because it is used only to make communication configurations be compatible with or communicate with each other—the actual data for the communication must be exchanged using other protocols designed for that purpose.

For this purpose, the Session Description Protocol (SDP, RFC 4566) is often embedded in SIP, in order to handle the details of the video and/or audio transfer. It makes the devices tell each other which audio and video transfer methods they are using (the so-called Codecs), with which protocol they want to do it, and at which network addresses they wish to send and receive.

This media negotiation is therefore not a direct component of SIP, but rather is achieved by having another protocol embedded in SIP. This separation of session and media control is one of SIP's advantages, because it allows great flexibility in the supported usage load. For example, if a manufacturer wishes to use SIP for a specialized application, he can draft a suitable media negotiation for it, if no protocol yet exists for it.

Embodiments may have a variety of advantages depending on the embodiment.

For one, they may allow the participants in a communication system to be offered services such as voice over IP or voice and video over IP with the best possible quality, in which not only are user data streams routed through the network with exceptionally high priority—using the Real Time Protocol (RTP), for example—but also the signaling in the communication system can be performed with a defined quality level. The invention therefore allows for constant monitoring of connection quality, preferably using protocols such as the Real Time Control Protocol (RTCP) and Real Time Application Quality-of-Service Monitoring (RAQMON).

With embodiments of the invention, it is now possible to influence undesirable events such as very slow connection attempts or connection interruptions, especially events whose origin is not related to data stream transmission, from a quality improvement standpoint. In particular, the invention allows quality assessment of the signaling in the communication system, independently of the quality criteria for the user data stream. This is preferably accomplished by having the relevant data collected for assessing signal quality be entered in a corresponding service quality report for central analysis in the communication system.

Preferably, for this, quality data for signaling connections collected in the terminals are sent to one or more central collectors, where these data are used, preferably in addition to already existing quality data on the user data connections, for a detailed assessment of the network situation. The invention therefore makes it possible to clarify and rectify previously often unclear situations in communication systems, which was not possible with prior known systems given the lack of relevant signaling connection quality data.

The invention is described below in more detail, based on preferred exemplary embodiments and with reference to a FIGURE.

As an example, the invention can be illustrated by a communication system in which three communication terminals 1, 2, and 3, in the example a wireless access point, a gateway, and a telephone, collect data 7, 8, and 10 about timeout events or faulty transfers in connection with at least one signaling process. The collected data are sent by the communication terminals 1, 2, and 3 to a collection point 4, which preferably also collects data 6, 9, and 11 on the quality of the user data connection with devices 1, 2, and 3. The collected data 12 are sent from the collection point 4 to a central collection point 5, which can take action to improve connection and service quality based on the collected information.

We claim:

1. A method for monitoring a communication system, comprising:
   a) acquiring and storing data in at least one first communication terminal of the communication system about at least one of (i) faulty information elements of messages that were rejected or replaced by defaults, and (ii) inadmissible information elements of messages that were rejected or replaced by defaults for evaluating quality of signaling in the communication system, the acquired and stored data being independent of data relating to quality of user data streams, the acquired and stored data for evaluating the signaling quality comprising data relating to at least one of (a) response times for the communication system in connection with at least one signaling process in which the first communication terminal is involved, and (b) information about message repetitions in connection with at least one signaling process in which the first communication terminal is involved;
   b) creating a collection of said data for evaluating the signaling quality and transmitting that data collected in the at least one first communication terminal to a collection point for said data in the communication system; and
   c) using the data for evaluating the signaling quality that the collection point received from the at least one first communication terminal in the collection point to evaluate the quality of signaling in the communication system.

2. The method of claim 1, wherein the acquired and stored data for evaluating the signaling quality comprises both (a) the response times for the communication system in connection with at least one signaling process in which the first communication terminal is involved, and (b) the information about message repetitions in connection with at least one signaling process in which the first communication terminal is involved.

3. The method of claim 1, wherein the collection of said data for evaluating the signaling quality includes response times for the communication system in connection with at least one signaling process in which the first communication terminal is involved.

4. The method of claim 3, wherein the collection of said data for evaluating the signaling quality includes information about message repetitions in connection with an at least one signaling process in which the first communication terminal is involved.

5. The method of claim 4, wherein the collection of said data for evaluating the signaling quality includes information about faulty information elements of messages that were rejected or replaced by defaults involved in at least one signaling process in which the first communication terminal is involved.

6. The method of claim 1, wherein the collection of said data for evaluating the signaling quality includes information about data collection time.

7. The method of claim 1, wherein the collection of said data for evaluating the signaling quality includes information about inadmissible information elements of messages that were rejected or replaced by defaults involved in at least one signaling process in which the first communication terminal is involved.

8. The method of claim 1, wherein the collection of said data for evaluating the signaling quality includes information about CPU usage of a component in the communication system participating in the signaling process during data collection.

9. The method of claim 1, wherein the collection of said data for evaluating the signaling quality is transmitted after a reliable connection for data transmission has been established from the first communication terminal to the collection point in the communication system.

10. The method of claim 1, wherein the collection of said data for evaluating the signaling quality is transmitted as an unsolicited message from the first communication terminal to the collection point within a framework of a network management protocol.

11. The method of claim 1, wherein the collection of the data is transmitted as an unsolicited message from the first communication terminal to the collection point within a framework of a transfer control protocol.

12. The method of claim 1, wherein the collection of the data is transmitted as an unsolicited message from the first communication terminal to the collection point within the framework of a voice-over-IP signal.

13. The method of claim 1, comprising:
    sending the collection of data for evaluating the signaling quality to a central evaluation collection point within the communication system;
    improving connection and service quality by the central evaluation collection point based on the collection of data for evaluating the signaling quality received by the central evaluation collection point and data relating to quality of user data streams received by the central evaluation collection point.

14. A communication system comprising:
    a first communication terminal configured to acquire and store data about at least one of (i) faulty information elements of messages that were rejected or replaced by defaults, and (ii) inadmissible information elements of messages that were rejected or replaced by defaults for quality evaluation of signaling in the communication system, the acquired and stored data being independent of data about quality of user data streams, the acquired and stored data comprising data relating to at least one of (a) response times for the communication system in connection with at least one signaling process in which the first communication terminal is involved, and (b) information about message repetitions in connection with at least one signaling process in which the first communication terminal is involved;
    the first communication terminal being configured to create a collection of the acquired and stored data relevant for evaluating signaling quality and to transmit that collection of data to at least one first collection point that is configured to receive the collection of the data from the first communication terminal and also being configured to receive data relating to the quality of the user data streams.

15. The communication system of claim 14, wherein the first collection point is configured to send the received collection of the data from the first communication terminal and received data relating to the quality of the user data streams to a central collection point to evaluate quality of signaling in the communication system.

16. The communication system of claim 15, further comprising:
    a central collection point that is configured to receive the data from the first collection point that comprises (i) the collection of data the first collection point receives from the first communication terminal and (ii) the data collected on the quality of user data streams to evaluate that data and take measures to improve connection and service quality within the communication system so that signaling in the communication system meets a pre-defined quality threshold.

17. The communication system of claim 16, wherein the collection of the acquired and stored data comprises data about message repetitions in connection with the at least one signaling process in which the first communication terminal is involved.

18. The communication system of claim 14, wherein the collection of the acquired and stored data relevant for evaluating signaling quality comprises response times for the communication system in connection with at least one signaling process in which the first communication terminal is involved.

19. The communication system of claim 14, wherein the collection of the acquired and stored data relevant for evaluating signaling quality comprises the information about the inadmissible information elements in connection with at least one signaling process in which the first communication terminal is involved and data collection time for that information.

20. The communication system of claim 14, wherein the collection of the acquired and stored data relevant for evaluating signaling quality comprises the information about the faulty information elements in connection with at least one signaling process in which the first communication terminal is involved and data collection time for that information.

* * * * *